(12) United States Patent
Dole

(10) Patent No.: US 8,302,514 B2
(45) Date of Patent: Nov. 6, 2012

(54) PIPE PROCESSING DEVICE HAVING FLOATING DRIVE ROLLER

(75) Inventor: Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 493 days.

(21) Appl. No.: 12/716,744

(22) Filed: Mar. 3, 2010

(65) Prior Publication Data

US 2010/0223970 A1 Sep. 9, 2010

Related U.S. Application Data

(60) Provisional application No. 61/158,046, filed on Mar. 6, 2009.

(51) Int. Cl.
*B23B 5/16* (2006.01)
*B23B 5/00* (2006.01)
*B21D 17/04* (2006.01)

(52) U.S. Cl. ............... 82/113; 82/123; 72/101; 72/105; 72/106

(58) Field of Classification Search ............... 82/86, 113, 82/123; 72/101, 105, 106, 110, 125
See application file for complete search history.

(56) References Cited

U.S. PATENT DOCUMENTS

| | | | |
|---|---|---|---|
| 2,753,739 A | 7/1956 | Dreier | |
| 3,247,743 A | 4/1966 | Frost et al. | |
| 3,699,828 A * | 10/1972 | Piatek et al. | 82/113 |
| 3,714,712 A | 2/1973 | Hoffman | |
| 3,756,100 A * | 9/1973 | Bachmann | 82/113 |
| 3,850,058 A * | 11/1974 | Bachmann | 82/101 |
| 4,166,370 A | 9/1979 | Goodman | |
| 4,247,234 A | 1/1981 | Hoffman | |
| 4,532,837 A | 8/1985 | Cushenberry et al. | |
| 5,079,940 A | 1/1992 | Pulver et al. | |
| 5,429,021 A | 7/1995 | Astle et al. | |
| 5,778,715 A | 7/1998 | Lippka et al. | |
| 7,223,054 B1 | 5/2007 | Cady | |
| 2001/0001935 A1 | 5/2001 | Wilk, Jr. et al. | |

OTHER PUBLICATIONS

PCT International Search Report regarding International Application No. PCT/US2010/026066, May 19, 2010.
PCT International Search Report regarding International Application No. PCT/US2010/026066, Jun. 7, 2010.

* cited by examiner

*Primary Examiner* — David B Jones
(74) *Attorney, Agent, or Firm* — Ballard Spahr LLP

(57) ABSTRACT

A device for processing a pipe has a bearing plate slidably mounted on a support plate. A drive roller, engageable with an inner surface of a pipe, is mounted on the bearing plate and rotates about an axis substantially parallel to the longitudinal axis of the pipe. Support rollers, mounted on the support plate, engage and support the pipe against the drive roller. Springs are positioned in contact with the support plate and the bearing plate and bias the drive roller into engagement with the pipe. Variations in pipe wall thickness are compensated for by sliding motion of the bearing plate relatively to the support plate as the drive roller rotates and the pipe and the device move relatively to one another.

25 Claims, 6 Drawing Sheets

PIPE PROCESSING DEVICE HAVING FLOATING DRIVE ROLLER

CROSS REFERENCE TO RELATED APPLICATION

This application is based upon and claims priority to U.S. Provisional Application No. 61/158,046, filed Mar. 6, 2009, which application is hereby incorporated by reference herein.

FIELD OF THE INVENTION

This invention concerns a device for processing pipes, which processes require relative rotation between device and pipe, and especially for processing pipes having sidewall thicknesses which vary as a function of circumferential position.

BACKGROUND

Due to characteristics inherent in their manufacturing processes, various types of pipes will have a sidewall thickness that varies as a function of position about the pipe circumference. For example, pipe having a welded seam has a sidewall that is thicker at the weld bead than at positions away from the bead. Seamless pipe and cast pipe made from ductile iron are well known to have sidewalls which vary in thickness around the circumference between a thicker zone and a thinner zone due to an eccentricity between the inner and outer diameters. Cast pipe may also have a cement lining which is sprayed onto the pipe's inner surface. The cement coating is nominally ⅛ to 3/16 inches thick, but will vary in actual thickness due to various process and environmental parameters. A coating of tar, whose thickness may also vary, is often applied to protect the cement. The variation in thickness of the coating layers combines with the variation in pipe wall thickness, sometimes compensating for and sometimes adding to the pipe sidewall variation to produce a pipe having thick and thin sidewall regions.

Devices according to the prior art which perform various processes on pipes that require rotating the pipe relative to the device or vice-versa, for example, cutting circumferential grooves in the outer surfaces of pipes, are exemplified by the pipe cutter disclosed in U.S. Pat. No. 3,247,743 to Frost et al. As shown therein, the sidewall of a pipe is captured between a drive roller and two support rollers mounted on pivoting arms. The drive roller engages the inner surface of the pipe, and the support rollers engage the outside surface of the pipe. The support rollers are pivoted toward one another to force the pipe sidewall against the drive roller. Forcing the pipe against the drive roller provides purchase enabling the drive roller to propel the pipe cutter around the circumference of the pipe when the drive roller is turned. Alternately, for short pipe segments, the pipe cutter remains fixed and the pipe is supported on the support rollers and is turned about its longitudinal axis by rotation of the drive roller to form the groove.

If the pipe sidewall had a constant thickness as a function of circumferential position then the force between the pipe sidewall and the drive roller would also be substantially constant for a given setting of the support rollers' position relatively to the drive roller as the drive roller rotated to move the cutting device about the pipe circumference. However, the varying sidewall thickness results in a significant variation in force between the drive roller and pipe sidewall for a given setting of the support roller positions. The pipe sidewall thickness may vary so much that when a thin region is between the drive roller and the support rollers there may not be sufficient purchase between the pipe sidewall and the drive roller to permit the drive roller to move the cutting device around the pipe circumference. In such a situation the cutting device remains stationary even though the drive roller continues to turn. To remedy this problem the technician overseeing the device adjusts the position of the support rollers by pivoting them closer to the drive roller, thereby compensating for the decrease in sidewall thickness and increasing the force between the drive roller and the inner surface of the pipe sidewall. This adjustment to the position of the support rollers causes the drive roller to gain purchase and begin moving the cutting device around the pipe again about its longitudinal axis. However, as the cutting device orbits the pipe, a thicker sidewall region inevitably moves to a position between the support rollers and the drive roller. The force between the drive rollers and the pipe sidewall increases as a result, placing increased stress on the various machine components and requiring greater torque be applied to turn the drive roller. The force may be great enough to permanently yield or break some parts, and also accelerates failures of high stressed components, such as shafts and keys, by fatigue failure due to the cycling of large stress variations caused by cyclical bending loads imposed on a shaft. There is clearly a need for a pipe processing device, for example, a groove cutting device, which can handle pipes having sidewalls of varying thickness without failing due to high stresses or stress reversals which accelerate fatigue failure.

SUMMARY

The invention concerns a device for processing a pipe. The device comprises a housing and a bearing mounted on the housing. The bearing is movable relatively to the housing. A drive roller is mounted on the bearing and is rotatable about a first axis. The drive roller has a circumferential surface engageable with an inner surface of the pipe. At least one spring element is positioned between the bearing and the housing for biasing the drive roller into engagement with the inner surface of the pipe. At least a first support roller is mounted on the housing in spaced relation to the drive roller. The first support roller is rotatable about an axis oriented substantially parallel to the first axis. The first support roller has a circumferential surface engageable with an outer surface of the pipe. The first support roller is adjustably movable toward and away from the first axis.

Means for rotating the drive roller about the first axis are provided. The means for rotating the drive roller may comprise an electric motor or a hand crank, for example. Rotation of the drive roller causes relative motion between the device and the pipe when the longitudinal axis of the pipe is oriented substantially parallel to the first axis. The spring element biases the drive roller into engagement with the inner surface of the pipe. The drive roller is movable toward and away from the support roller upon motion of the bearing relatively to the housing thereby compensating for a variation in sidewall thickness of the pipe.

In an example embodiment, the housing comprises a first plate and the bearing comprises a second plate slidably mounted within an opening in the first plate. The spring element is positioned between the first and second plates. Alternately, the device may have a plurality of spring elements positioned between the first and second plates. The device may further comprise a second support roller mounted on the housing in spaced apart relation to the first support roller and the drive roller. The second support roller also has a circumferential surface engagable with an outer surface of the pipe. The second support roller is also adjustably movable toward and away from the first axis.

An embodiment of the device may also comprise first and second arms. Each arm is pivotably mounted on the housing. The first support roller is rotatably mounted on the first arm, the second support roller is rotatably mounted on the second arm. The first and second rollers are movable toward and away from one another and the first axis upon pivoting motion of the first and second arms. A first traveling nut is mounted on the first arm, the first traveling nut has internal threads therein. A second traveling nut is mounted on the second arm, the second traveling nut also has internal threads therein. A screw shaft is mounted on the housing and engages the first and second traveling nuts. A first portion of the screw shaft has external threads thereon compatible with the internal threads of the first traveling nut, and a second portion of the screw shaft has external threads thereon compatible with the internal threads of the second traveling nut. Rotation of the screw shaft relatively to the housing causes the pivoting motion of the first and second arms.

In one embodiment of the device, the housing comprises a pair of plates attached to one another in substantially parallel, spaced apart relation. The arms and the screw shaft are mounted between the pair of plates.

The housing may be mounted on the pipe, in which case rotation of the drive roller about the first axis propels the device about the circumference of the pipe. Alternately, the housing may comprise a fixed support, in which case the pipe is mountable on the housing between the drive roller and the support roller. Rotation of the drive roller about the first axis rotates the pipe about its longitudinal axis relatively to the device. The fixed support may comprise, for example, a plurality of legs attached to the housing.

One example of a process for which the device is appropriate is cutting a circumferential groove in the outer surface of a pipe. To this end, a cutting tool may be mounted on the housing. The cutting tool has a cutting edge movable toward and away from the pipe when the pipe is positioned with its inner surface engaging the drive roller and its outer surface engaging the support roller. The cutting tool may be mounted on a jackscrew. The jackscrew is mounted on the housing. The cutting tool is movable toward and away from the pipe upon rotation of the jackscrew relatively to the housing.

DETAILED DESCRIPTION OF EMBODIMENTS

Figure 1:
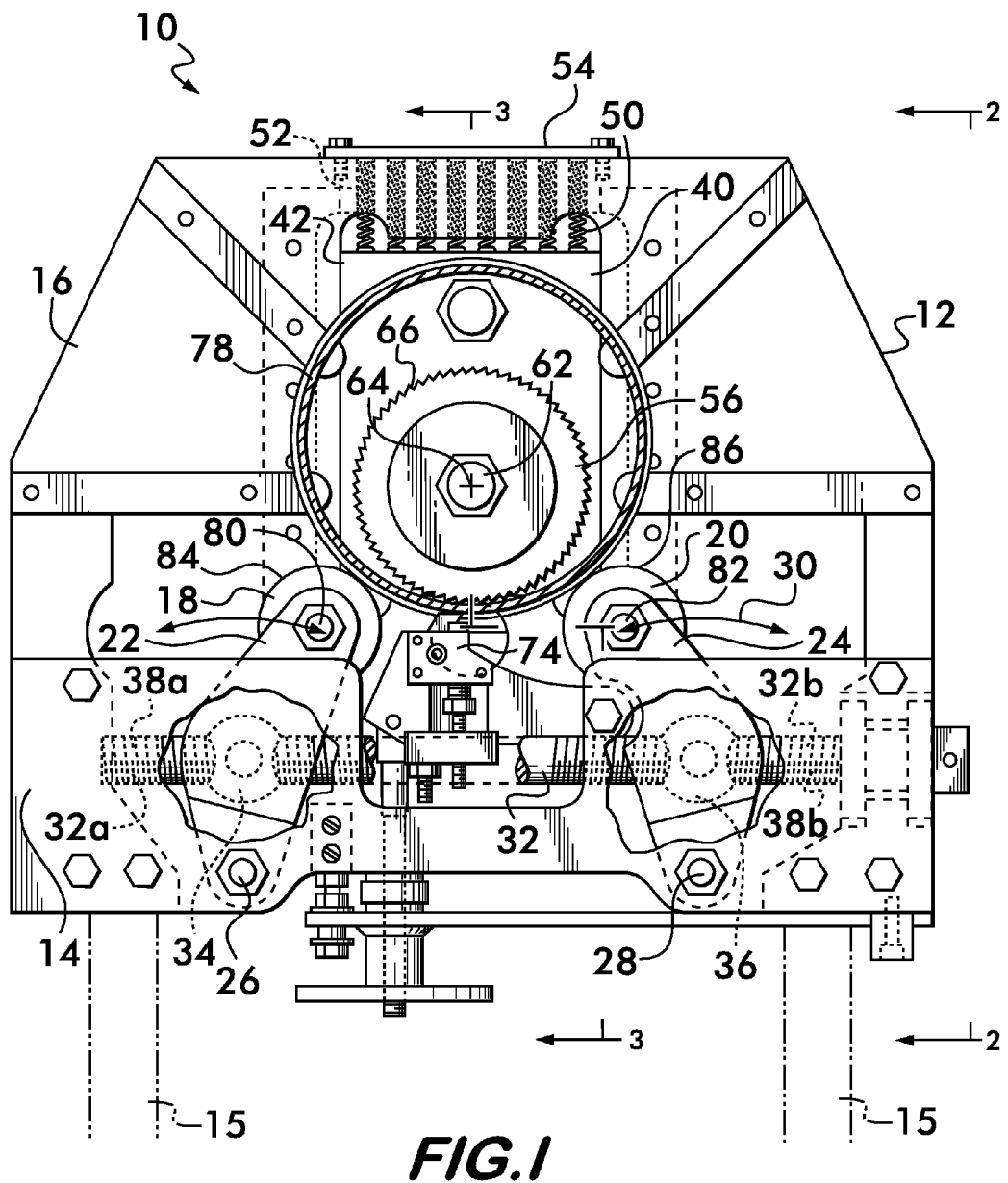
FIG. 1 is a front view of an example device according to the invention.

FIG. 1 shows a device 10 for processing pipe. By way of example, device 10 as shown cuts circumferential grooves in pipes, it being understood that the device may be adapted to execute other processes which require that the pipe and device rotate relatively to one another. Device 10 comprises a housing 12 including a front plate 14 and a main plate 16 on which various components are mounted as described below. Device 10 may be mounted on a fixed support, such as legs 15, shown in phantom line. In this embodiment the pipe to be processed is mounted on the device and rotates about its longitudinal axis as described below. In another embodiment, the device has no fixed supports and mounts directly onto the pipe. With no fixed supports the device orbits the pipe circumference during processing.

Figure 2:
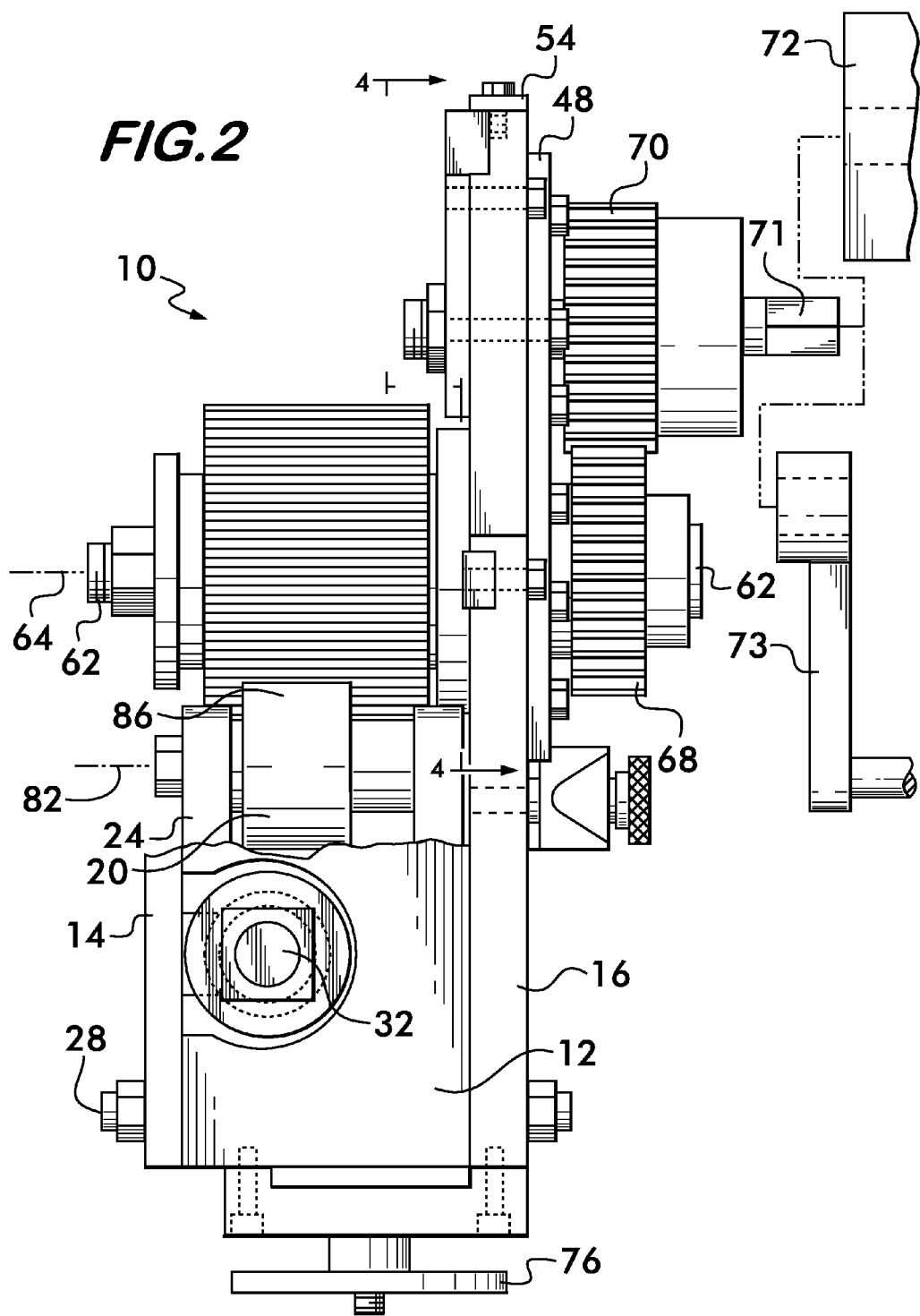
FIG. 2 is a side view of the device taken at line 2-2 in FIG. 1 with parts partially broken away.

Two support rollers 18 and 20 are mounted on respective arms 22 and 24. Arms 22 and 24 are mounted on respective axles 26 and 28 which extend between the front plate 14 and the main plate 16 as shown in FIG. 2 for axle 28. Arms 22 and 24 are free to pivot about the axles toward and away from one another as indicated by arrows 30 in FIG. 1. Pivoting motion of arms 22 and 24 is effected by a screw shaft 32 on which traveling nuts 34 and 36 are mounted. The screw shaft 32 is positioned between the front and main plates 14 and 16 and is rotatable about its longitudinal axis. Traveling nut 34 is rotatably attached to arm 22, and traveling nut 36 is rotatably attached to arm 24. The traveling nuts 34 and 36 have internal screw threads, the threads being reversed from one another, with a right-handed thread on traveling nut 34 and a left-handed thread on traveling nut 36. The screw shaft 32 has external threads which are matched in pitch and handedness to the traveling nuts which they engage. Thus, the left portion, 32a, of screw shaft 32 has right-handed threads 38a, and the right portion, 32b, of screw shaft 32 has left-handed threads 32b. This difference in handedness of the threads allows the arms 22 and 24 to be pivoted about respective axles 26 and 28 in opposite directions upon rotation of the screw shaft 32. Rotation of screw shaft 32 in a clockwise direction (as viewed in FIG. 2) will pivot the arms 22 and 24 toward one another, while rotation of the screw shaft in the opposite direction will pivot the arms away from one another. The pivoting motion of arms 22 and 24 moves the support rollers 18 and 20 toward or away from one another to accommodate pipes of different diameters and wall thicknesses as described below.

Figure 4:
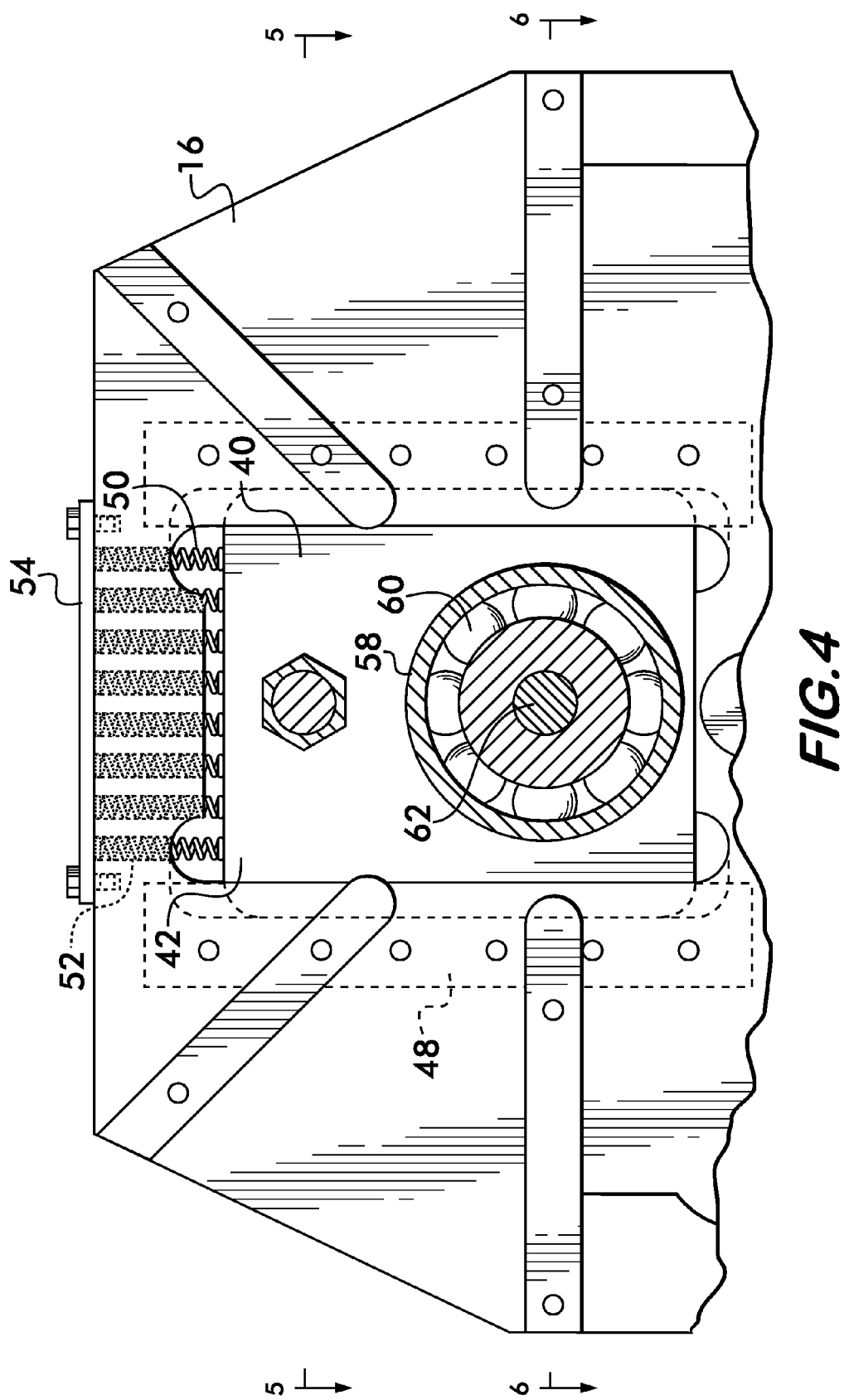
FIG. 4 is a sectional view taken at line 4-4 of FIG. 2.

As shown in FIGS. 1 and 4, a bearing 40 is mounted on the main plate 16 of the housing 12. Bearing 40 comprises a bearing plate 42 that is free to move with respect to the main plate 16 in a direction toward and away from support rollers 18 and 20. As further shown in FIGS. 5 and 6, the bearing plate 42 has oppositely disposed projecting tongues 44 which ride in grooves 46 in main plate 16. Grooves 46 are formed using a pair of retainer plates 48 which are bolted onto the main plate 16. This arrangement provides for rapid assembly and disassembly of the bearing for servicing. The tongue and groove arrangement allows for sliding motion of the bearing plate 42 relative to the main plate 16, hence the bearing plate is considered to "float" within the housing 12.

As shown in FIGS. 1 and 4, the bearing plate 42 is spring biased toward the support rollers 18 and 20 by a plurality of springs 50 positioned in contact with the main plate 16 and the bearing plate 42. Springs 50 are housed within wells 52 located in the main plate 16. The springs 50 are retained in main plate 16 by a bar 54 that is bolted to plate 16 overlying wells 52. This configuration allows the springs 50 to be inserted into the wells with the bearing plate 42 in position on the main plate 16. Bar 54 may be used to establish a preload on the springs 50. This is effected by having springs which are longer than the wells 52 and therefore extend from the top of the main plate 16 when they are supported on the bearing plate 42. The bar 54 is then bolted to the main plate 16, the bolts being tightened to force the bar 54 to compress the springs 50 until the desired preload is achieved. Spring preloads from about 2500 to about 3000 lbs are advantageous for a practical application such as pipe groove cutting.

For a practical design the springs may be alternately stacked Bellville washers or coil springs (shown). Other types of springs, such as leaf springs, tension springs and the like are also feasible. Eight springs are shown by way of example, the number and type of springs depending on various design parameters including the size and type of pipe on which the device is intended to be used and the particular process to be executed. The bearing plate may have up to ¼ inch of travel which will allow it to compensate for the variation in pipe wall thickness as described in detail below.

Figure 5:
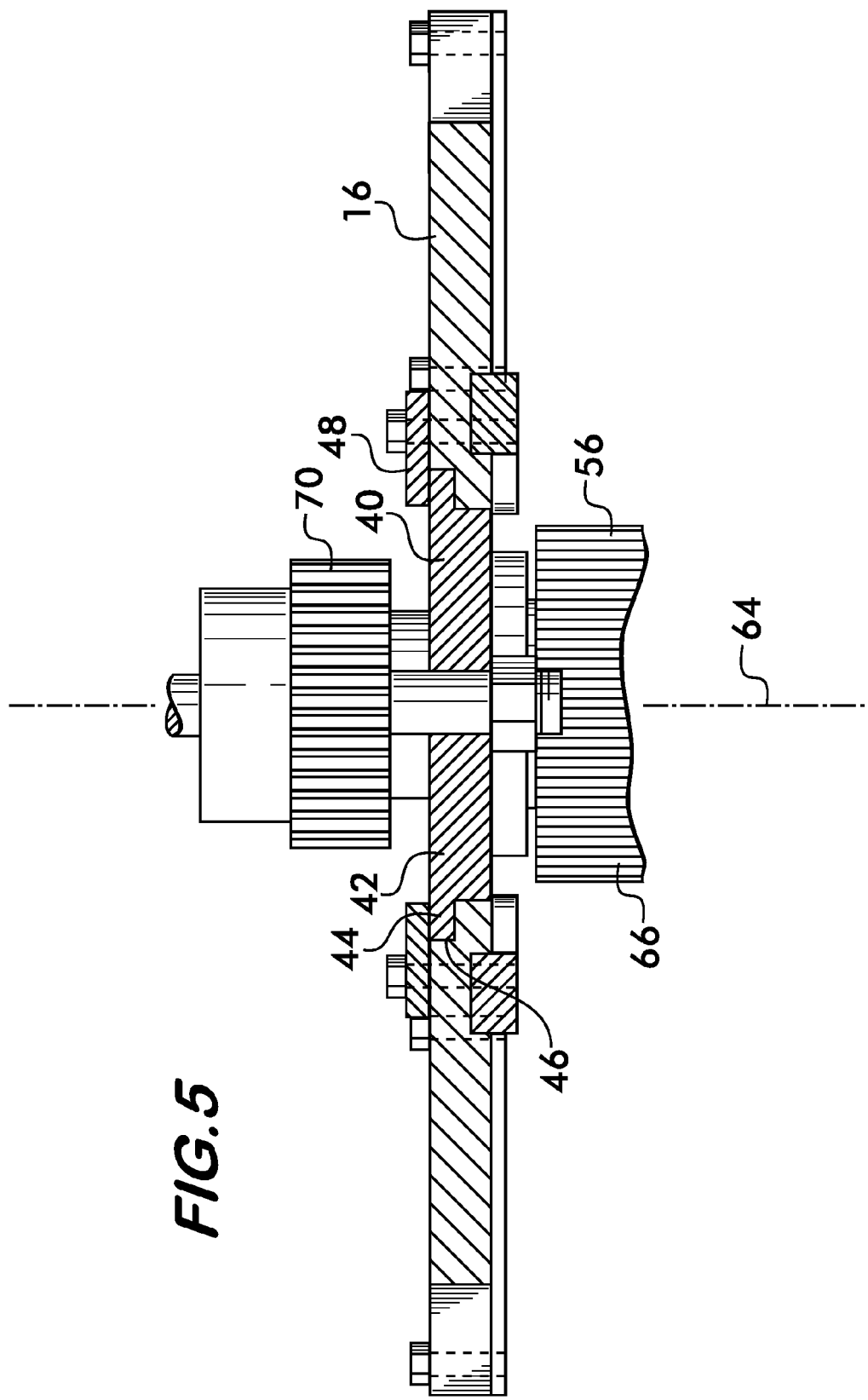
FIG. 5 is a sectional view taken at line 5-5 of FIG. 4.
Figure 6:
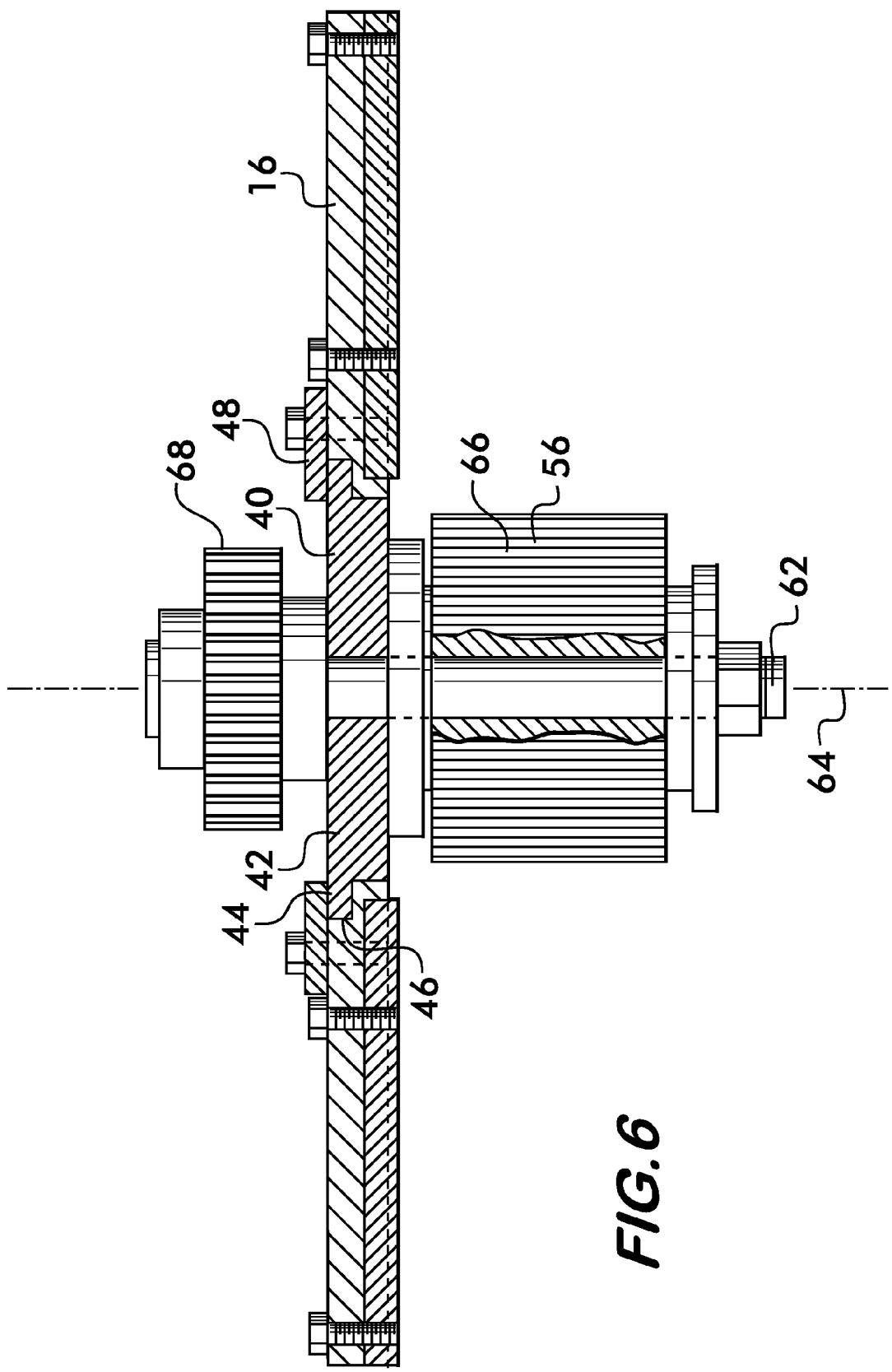
FIG. 6 is a sectional view taken at line 6-6 of FIG. 4.

As further shown in FIG. 1, a drive roller 56 is rotatably mounted on the bearing plate 42. As shown in detail in FIG. 4, the bearing plate 42 accommodates a bearing race 58 and ball bearings 60 which rotatably support a shaft 62 on which the drive roller 56 is mounted. Other types of bearings, for example, journal bearings, are also feasible. As shown in FIGS. 5 and 6, the drive roller 56 is rotatable about the longitudinal axis 64 of the shaft 62 and has a toothed circumferential surface 66 engageable with the inner surface of a pipe. FIG. 2 shows example means for rotating the drive roller, which include a gear train comprised of a gear 68 mounted on shaft 62 and a gear 70 which meshes with gear 68 and is rotatably mounted on the bearing plate 42. Gear 70 is turned by a geared down electric motor 72 which engages shaft 71 and rides with the bearing plate 42. The motor gearing will depend on the process for which the device is being used. For cutting circumferential grooves in pipes for example, gear 70 is advantageously driven at a reduced speed of about 35 RPM. This gear speed allows device 10 to orbit the pipe at a reasonable and controlled speed and results in a practical cutter surface speed at the pipe that is advantageous for cutting metal cleanly without excessive friction, heat or chatter. The speed can of course be changed as required by other processes by varying the gear ratio of the gear train. Gears 68 and 70 provide a reversing function so that, when viewed from the motor side of the device, the device traverses the pipe circumference in a consistent direction with the rotation of the motor, i.e., the device orbits in a clockwise sense when the gear 70 rotates in a clockwise direction.

Alternately, the motor could be mounted on the housing and connected to the shaft 71 by a flexible coupling which allows the bearing plate 42 freedom to move relatively to the main plate 16. As a further alternative, motor 72 could also be coupled directly to shaft 62, or shaft 62 could be manually turned by a crank 73 coupled directly to the shaft, or the crank 73 could engage shaft 71 to turn shaft 62 through a gear train.

Figure 3:
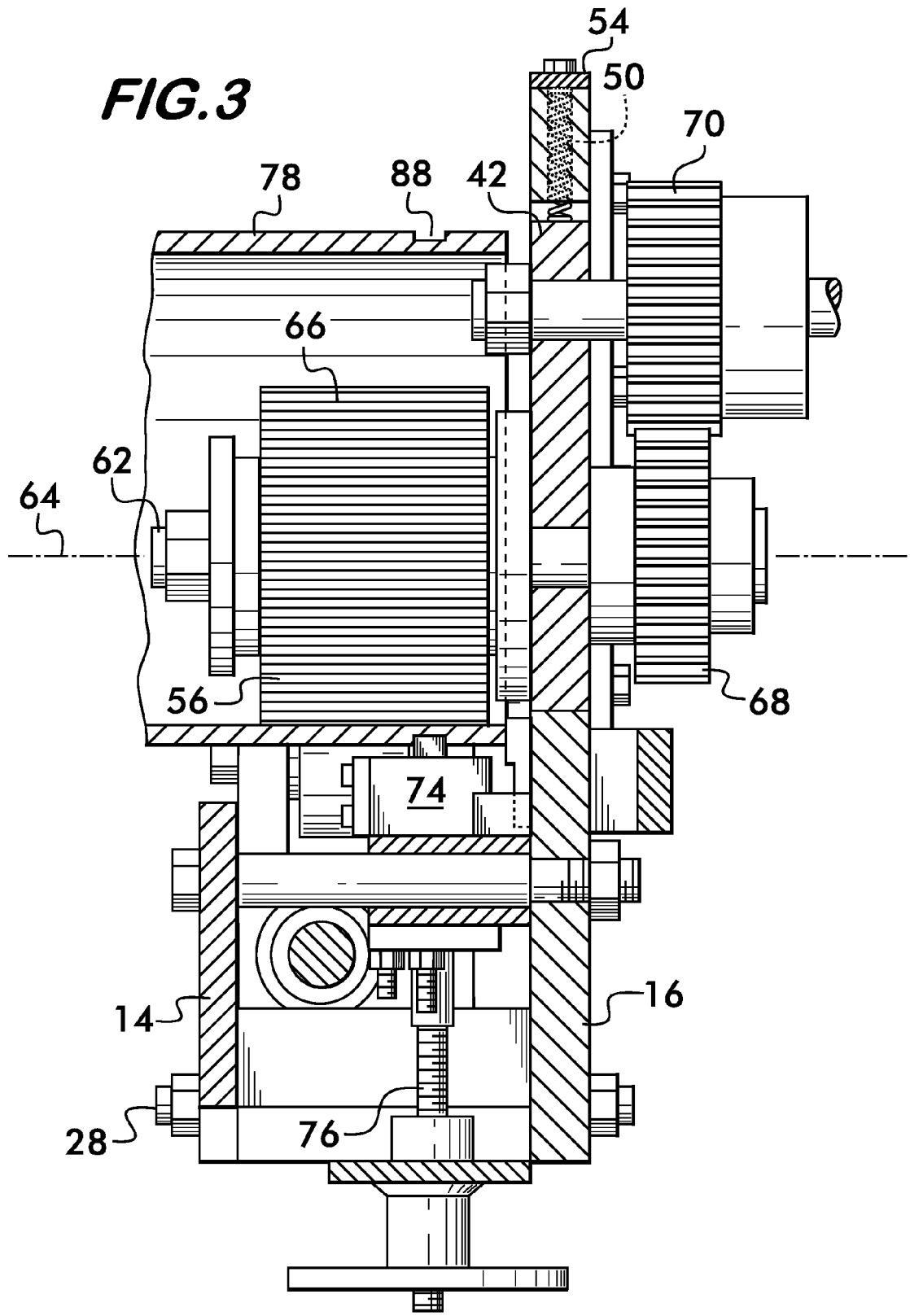
FIG. 3 is a sectional view taken at line 3-3 of FIG. 1.

FIGS. 1 and 3 illustrate a specific example embodiment of the device 10 adapted for cutting circumferential grooves in pipes. To effect the cutting process an adjustable cutting tool 74 is mounted on the housing 12, adjustment toward and away from the drive roller 56 being provided via a jackscrew 76 which engages the tool 74. Other tools for performing other processes could easily be mounted in place of, or in addition to, the cutting tool 74.

Operation of device 10 without fixed supports is described with reference to FIG. 1. In the description of the device operation, references are made to the relative orientation of the axes of rotation of rollers as being "substantially parallel" to the longitudinal axis of the pipe being grooved or "substantially parallel" to one another. Substantially parallel as used herein means that there may be small angular differences between the axes of rotation of the rollers and the longitudinal axis of the pipe which are used to induce axial forces on the pipe to ensure that it is always urged toward the device during grooving. Angular differences on the order of ½ of a degree between axes are practical in that they ensure the pipe is drawn toward the device 10 without adding excessive drag or friction during operation.

The screw shaft 32 is rotated to move support rollers 18 and 20 away from one another and also away from the axis of rotation 64 of the drive roller 56. This adjustment of the position of the support rollers separates them from the drive roller and allows a pipe 78 to be positioned between the support rollers 18 and 20 and the drive roller 56 with the longitudinal axis of the pipe substantially parallel to axis 64. In this embodiment positioning of the pipe 78 between the support rollers 18 and 20 and the drive roller 56 is effected by supporting the pipe and mounting the device on the pipe end.

The support rollers 18 and 20 rotate about respective axes 80 and 82, these axes being substantially parallel to the axis of rotation 64 of the drive roller 56 as shown in FIG. 2. Each support roller 18 and 20 has a respective circumferential surface 84 and 86 which engages the pipe 78. Once the pipe is positioned between the support rollers and the drive roller as shown in FIG. 1 the screw shaft 32 is rotated in the reverse direction to pivot arms 22 and 24 toward one another, thereby moving the support rollers toward the axis of rotation 64 of the drive roller 56 and bringing the circumferential surfaces 84 and 86 of the support rollers 18 and 20 into engagement with the outer surface of the pipe. Pipe 78 is thus supported on the support rollers, and continued pivoting of the arms 22 and 24 by rotation of the screw shaft 32 forces the inner surface of the pipe into engagement with the toothed circumferential surface 66 of the drive roller 56. The screw shaft 32 is rotated up to the point where the bearing plate 42 just begins to move against the biasing force of the springs 50. The electric motor 72 (see FIG. 2) is then started which turns the drive roller 56 in a clockwise direction. If the device is being used to cut a circumferential groove in the pipe 78, the jackscrew 76 is adjusted (see FIG. 3) to bias the cutting tool 74 into engagement with the outer surface of pipe 78. Engagement between the rotating drive roller 56 and the inner surface of the pipe 78 propels the cutting device 10 around the circumference of the pipe, the direction of travel in this example being in a counterclockwise direction when viewing FIG. 1.

In the embodiment having a fixed support, such as legs 15, operation is the same except that the pipe is mounted onto the device between the drive roller 56 and the support rollers 18 and 20. Rotation of the drive roller 56 rotates the pipe 78 relatively to the device 10, which is stationary on the fixed support. The fixed support embodiment is especially useful to process short length pipes.

When a thicker region of the pipe sidewall moves between the drive roller 56 and the support rollers 18 and 20, additional force is applied to the drive roller and the support rollers. This increase in force is accommodated by motion of the bearing plate 42, which slides relatively to the main plate 16 against the biasing springs 50. The springs 50 keep sufficient load on the plate to ensure that the drive roller 56 engages the inner surface of pipe 78 with sufficient force to keep the device 10 moving about the pipe circumference, but the motion of the bearing plate 42 relatively to the main plate 16 prevents components, such as the drive roller, the support rollers, and their respective shafts and arms from being subjected to damaging increases in stress which would otherwise occur if the drive roller were not permitted to "float" due to the motion of the bearing plate in response to the increase in force caused by the increased pipe wall thickness. In addition to limiting the force on various components of device 10, springs 50 also limit the increase in torque necessary to turn the drive roller when the thicker region passes between the rollers. If the bearing were not permitted to float the required toque would be significantly greater.

If a thinner region of the pipe sidewall moves between the support rollers 18 and 20 and the drive roller 56 there may be insufficient engagement force between the drive roller 56 and the inner surface of the pipe for the rotation of the drive roller to propel device 10 about the pipe circumference. If this occurs then the technician overseeing the device adjusts the screw shaft 32 to pivot arms 22 and 24 closer to one another, thereby bringing the support rollers 18 and 20 closer to the axis of rotation 64 of the drive roller 56 and increasing the engagement force between the drive roller and the pipe up to the point where the bearing plate 42 just begins to move against the biasing force of the springs 50. This restores the motion of the device 10 around the circumference of the pipe 78, enabling cutting of the groove 88 to proceed. When the thicker region of the pipe later passes between the support rollers as the device 10 traverses the pipe circumference the bearing plate 42 will again move relatively to the housing 12 against its biasing springs to accommodate the increased force and protect the device components from damage.

What is claimed is:

1. A device for processing a pipe, said device comprising:
   a housing;
   a bearing mounted on said housing, said bearing being movable relatively to said housing;
   a drive roller mounted on said bearing and rotatable about a first axis, said drive roller having a circumferential surface engageable with an inner surface of said pipe;
   at least one spring element in contact with said bearing and said housing for biasing said drive roller into engagement with said inner surface of said pipe;
   at least a first support roller mounted on said housing in spaced relation to said drive roller, said first support roller being rotatable about an axis oriented substantially parallel to said first axis, said first support roller having a circumferential surface engageable with an outer surface of said pipe, said first support roller being adjustably movable toward and away from said first axis;
   means for rotating said drive roller about said first axis, rotation of said drive roller causing relative motion between said device and said pipe when said longitudinal axis of said pipe is oriented substantially parallel to said first axis, said spring element biasing said drive roller into engagement with said inner surface of said pipe, said drive roller being movable toward and away from said support roller upon motion of said bearing relatively to said housing thereby compensating for a variation in sidewall thickness of said pipe.

2. The device according to claim 1, wherein said housing comprises a first plate.

3. The device according to claim 2, wherein said bearing comprises a second plate slidably mounted within an opening in said first plate.

4. The device according to claim 3, wherein said spring element is positioned in contact with said first and second plates.

5. The device according to claim 4, further comprising a plurality of said spring elements positioned in contact with said first and second plates.

6. The device according to claim 1, further comprising a second support roller mounted on said housing in spaced apart relation to said first support roller and said drive roller, said second support roller having a circumferential surface engagable with an outer surface of said pipe, said second support roller being adjustably movable toward and away from said first axis.

7. The device according to claim 6, further comprising first and second arms, each said arm being pivotably mounted on said housing, said first support roller being rotatably mounted on said first arm, said second support roller being rotatably mounted on said second arm, said first and second rollers being movable toward and away from one another and said first axis upon pivoting motion of said first and second arms.

8. The device according to claim 7, further comprising:
   a first traveling nut mounted on said first arm, said first traveling nut having internal threads therein;
   a second traveling nut mounted on said second arm, said second traveling nut having internal threads therein;
   a screw shaft mounted on said housing and engaging said first and second traveling nuts, a first portion of said screw shaft having external threads thereon compatible with said internal threads of said first traveling nut, a second portion of said screw shaft having external threads thereon compatible with said internal threads of said second traveling nut, rotation of said screw shaft relatively to said housing causing said pivoting motion of said first and second arms.

9. The device according to claim 8, wherein said housing comprises a pair of plates attached to one another in substantially parallel, spaced apart relation, said arms and said screw shaft being mounted between said pair of plates.

10. The device according to claim 1, wherein said housing is mountable on said pipe and rotation of said drive roller about said first axis propels said device about the circumference of said pipe.

11. The device according to claim 1, wherein said housing further comprises a fixed support, said pipe being mountable on said housing between said drive roller and said support roller, wherein rotation of said drive roller about said first axis rotates said pipe about its longitudinal axis relatively to said device.

12. The device according to claim 11, wherein said fixed support comprises a plurality of legs attached to said housing.

13. The device according to claim 1, wherein said means for rotating said drive roller comprises an electric motor.

14. The device according to claim 1, wherein said means for rotating said drive roller comprises a hand crank.

15. The device according to claim 1, further comprising a cutting tool mounted on said housing and having a cutting edge movable toward and away from said pipe when said pipe is positioned with its inner surface engaging said drive roller and its outer surface engaging said support roller.

16. The device according to claim 15, wherein said cutting tool is mounted on a jackscrew, said jackscrew being mounted on said housing, said cutting tool being movable toward and away from said pipe upon rotation of said jackscrew relatively to said housing.

17. A device for processing a pipe, said device comprising:
   a first and a second plate attached to one another in substantially parallel, spaced apart relation, said first plate having an opening therein;
   a bearing plate mounted on said first plate within said opening, said bearing plate being slidably movable relatively to and in the plane of said first plate;
   a drive roller mounted on said bearing plate and rotatable about a first axis, said drive roller having a circumferential surface engageable with an inner surface of said pipe;
   a plurality of spring elements in contact with said bearing plate and said first plate for biasing said drive roller into engagement with said inner surface of said pipe;
   a pair of support rollers mounted between said first and second plates in spaced relation to one another and said drive roller, each of said support rollers being rotatable about respective axes oriented substantially parallel to said first axis, each of said support rollers having a circumferential surface engageable with an outer surface of said pipe, said support rollers being adjustably movable toward and away from said first axis;

means for rotating said drive roller about said first axis, rotation of said drive roller causing relative motion between said device and said pipe when said longitudinal axis of said pipe is oriented substantially parallel to said first axis, said spring elements biasing said drive roller into engagement with said inner surface of said pipe, said drive roller being movable toward and away from said support roller upon motion of said bearing plate relatively to said first plate thereby compensating for a variation in sidewall thickness of said pipe.

18. The device according to claim 17, further comprising first and second arms, each said arm being pivotably mounted between said first and second plates, a first one of said support rollers being rotatably mounted on said first arm, a second one of said support rollers being rotatably mounted on said second arm, said first and second support rollers being movable toward and away from one another and said first axis upon pivoting motion of said first and second arms.

19. The device according to claim 18, further comprising:
a first traveling nut mounted on said first arm, said first traveling nut having internal threads therein;
a second traveling nut mounted on said second arm, said second traveling nut having internal threads therein;
a screw shaft mounted between said first and second plates and engaging said first and second traveling nuts, a first portion of said screw shaft having external threads thereon compatible with said internal threads of said first traveling nut, a second portion of said screw shaft having external threads thereon compatible with said internal threads of said second traveling nut, rotation of said screw shaft relatively to said plates causing said pivoting motion of said first and second arms.

20. The device according to claim 17, further comprises a fixed support attached to at least one of said first and second plates, said pipe being mountable between said drive roller and said support rollers, wherein rotation of said drive roller about said first axis rotates said pipe about its longitudinal axis relatively to said device.

21. The device according to claim 20, wherein said fixed support comprises a plurality of legs attached to said housing.

22. The device according to claim 17, wherein said means for rotating said drive roller comprises an electric motor.

23. The device according to claim 17, wherein said means for rotating said drive roller comprises a hand crank.

24. The device according to claim 17, further comprising a cutting tool mounted between said first and second plates and having a cutting edge movable toward and away from said pipe when said pipe is positioned with its inner surface engaging said drive roller and its outer surface engaging said support rollers.

25. The device according to claim 24, wherein said cutting tool is mounted on a jackscrew, said jackscrew being positioned between said first and second plates, said cutting tool being movable toward and away from said pipe upon rotation of said jackscrew relatively to said housing.

* * * * *